United States Patent
Heath

(10) Patent No.: US 11,164,053 B2
(45) Date of Patent: Nov. 2, 2021

(54) VARIABLE SMOOTHING IN PRINTING

(71) Applicant: Electronics for Imaging, Inc., Fremont, CA (US)

(72) Inventor: Peter Heath, Alexandria, NH (US)

(73) Assignee: ELECTRONICS FOR IMAGING, INC., Fremont, CA (US)

(*) Notice: Subject to any disclaimer, the term of this patent is extended or adjusted under 35 U.S.C. 154(b) by 0 days.

(21) Appl. No.: 17/070,838

(22) Filed: Oct. 14, 2020

(65) Prior Publication Data

US 2021/0027123 A1     Jan. 28, 2021

Related U.S. Application Data

(63) Continuation of application No. 16/510,572, filed on Jul. 12, 2019, now Pat. No. 10,846,574.

(51) Int. Cl.
*G06K 15/10* (2006.01)
*G06F 3/12* (2006.01)

(52) U.S. Cl.
CPC ............ *G06K 15/107* (2013.01); *G06F 3/125* (2013.01); *G06F 3/1208* (2013.01); *G06F 3/1254* (2013.01)

(58) Field of Classification Search
CPC ..... G06K 15/107; G06F 3/1208; G06F 3/125; G06F 3/1254
USPC ........................................................ 358/1.13
See application file for complete search history.

(56) References Cited

U.S. PATENT DOCUMENTS

| | | | | |
|---|---|---|---|---|
| 5,883,644 A | * | 3/1999 | Nicoloff, Jr. | ........... B41J 2/5056 347/12 |
| 6,364,446 B1 | ‡ | 4/2002 | Ishikawa | ............... G06K 15/107 347/15 |
| 6,688,726 B2 | ‡ | 2/2004 | Bauer | .................... B41J 2/2132 347/41 |
| 6,788,432 B1 | * | 9/2004 | Garcia | ................. G06K 15/107 347/1 |
| 8,328,311 B2 | ‡ | 12/2012 | Nakano | .................... B41J 9/142 347/12 |
| 2007/0057996 A1 | ‡ | 3/2007 | Yazawa | ................ B41J 11/0065 347/43 |
| 2007/0087273 A1 | ‡ | 4/2007 | Look | ......................... G03F 1/30 430/5 |
| 2007/0236526 A1 | * | 10/2007 | Noguchi | .............. H04N 1/4051 347/15 |
| 2009/0219557 A1 | * | 9/2009 | Lifshitz | ................. G06F 3/1284 358/1.13 |

(Continued)

FOREIGN PATENT DOCUMENTS

WO    WO-2018009820 A1 ‡   1/2018  ............. B41J 2/465

*Primary Examiner* — Allen H Nguyen
(74) *Attorney, Agent, or Firm* — Perkins Coie LLP

(57) ABSTRACT

Methods, apparatus and systems for printing an image using an array of nozzles are described. In one example aspect, a printer system includes an array of nozzles and a control device coupled to the array of nozzles. The control device is configured to determine a step size for printing a current section of an image based on a set of masks. The set of masks includes one or more masks used for printing previous sections of the image. The control device is also configured to adjust the set of masks based on a printing mode to be used for the current section of the image. The array of nozzles is configured to print the current section of the image using a combination of the adjusted set of masks.

20 Claims, 15 Drawing Sheets

(56) References Cited

U.S. PATENT DOCUMENTS

| | | | |
|---|---|---|---|
| 2018/0022112 A1* | 1/2018 | Billow | B41J 2/2146 |
| | | | 347/47 |
| 2018/0354262 A1‡ | 12/2018 | Nishihara | G06K 15/107 |
| 2018/0361754 A1‡ | 12/2018 | Ohara | B41J 2/205 |

\* cited by examiner
‡ imported from a related application

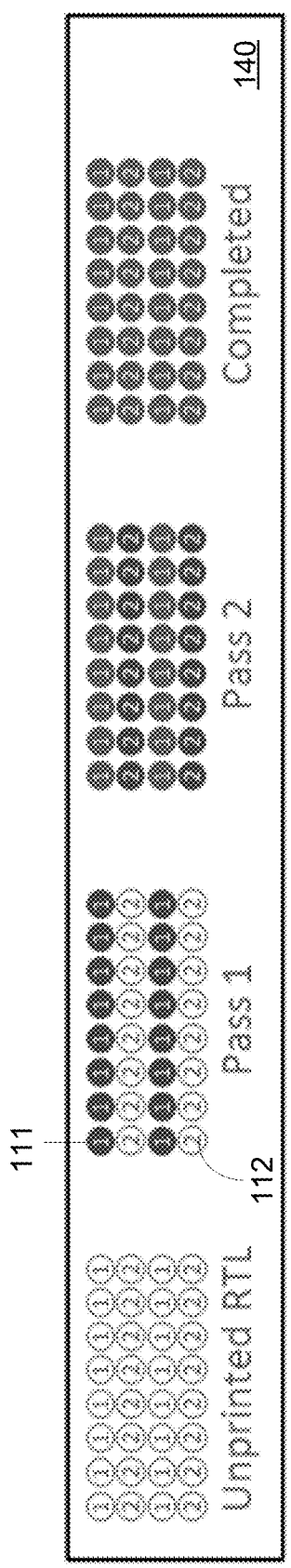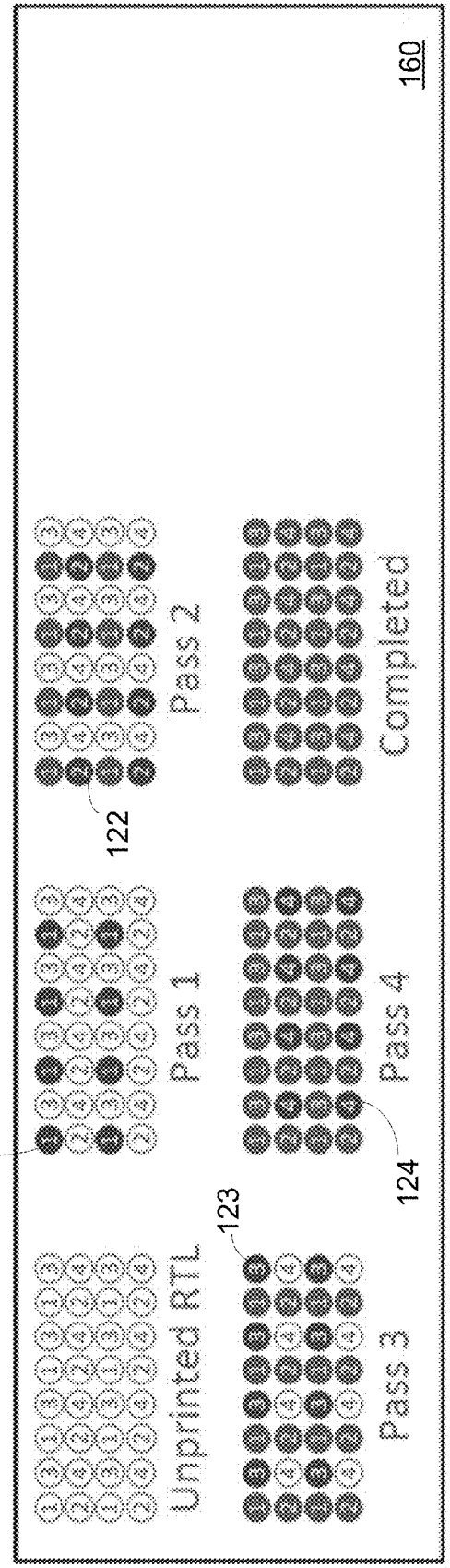
FIG. 1C
FIG. 1D

300

350

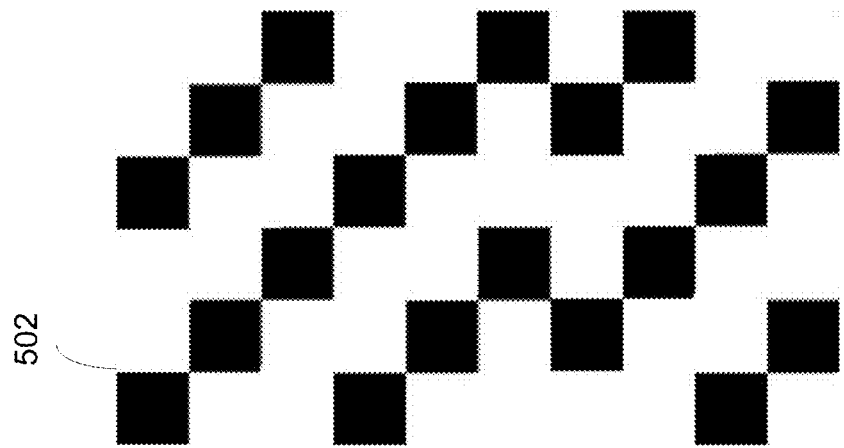
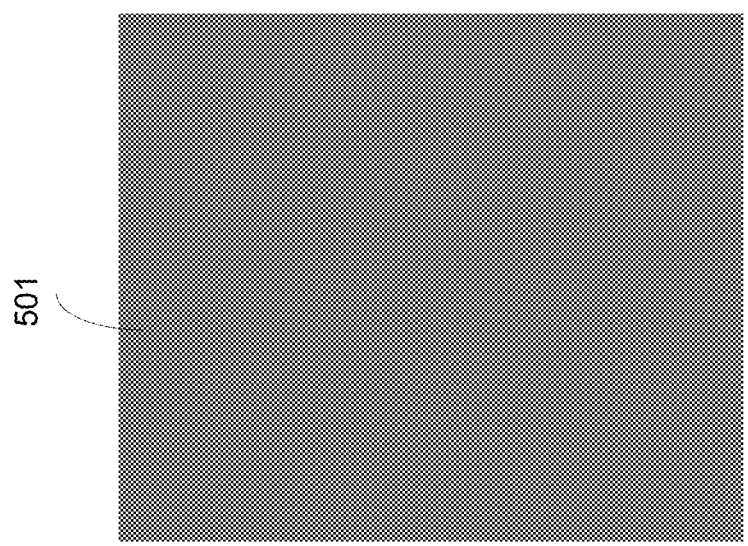
FIG. 5A

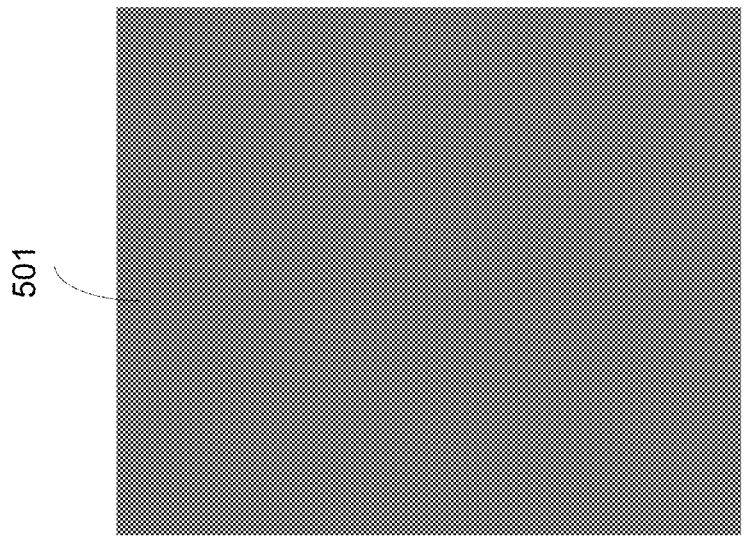
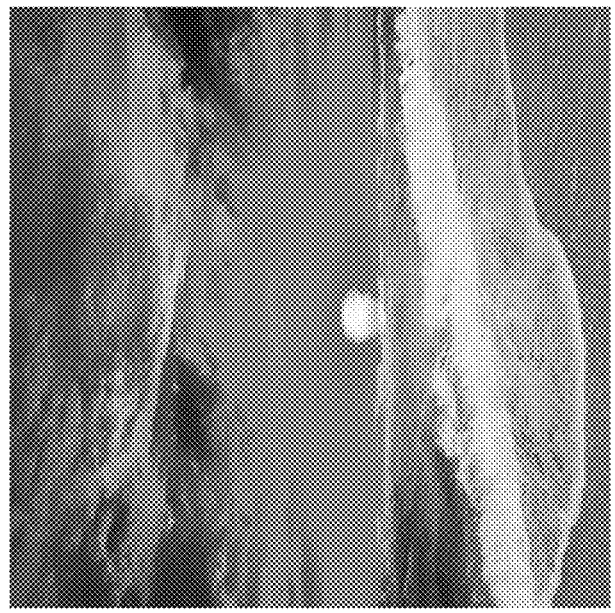
FIG. 5B

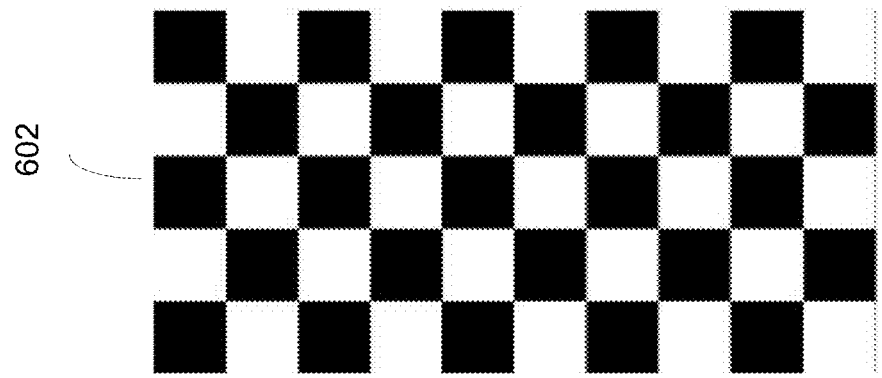
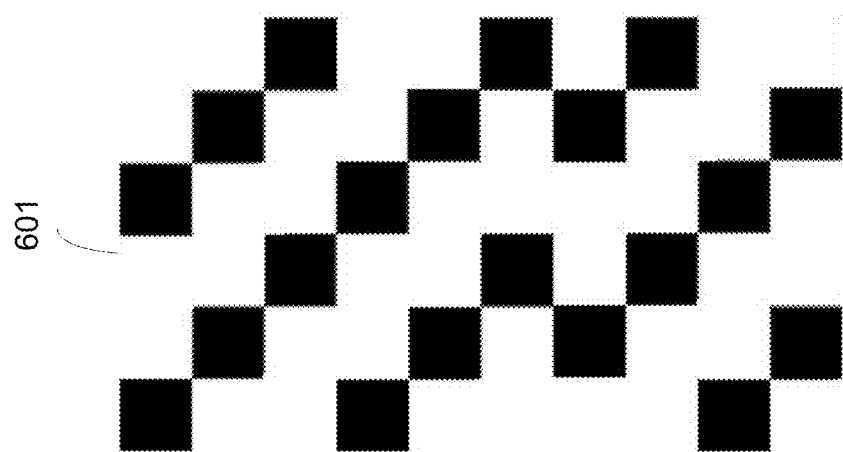
FIG. 6A

```
while (not done)
    //calculate step
    SD = nozzles; for (x = 0; x < m; x++) SD = min(masks[x].rate, rates[mn], SD)

//update on every pass
    for (x = 0; x < m; x++)
        masks[x].shift   += masks[x].rate - SD
        masks[x].overlap = min(masks[x].overlap + SD, nozzles)

if (newpassmode!=passmode)  //new passmode then add a new mask
        passmode = newpassmode;
        masks[m].filename = modefiles[passmode]
        masks[m].rate     = rates[passmode]
        masks[m].overlap  = SD
        if (masks[m].eatrate > SD)
            masks[m].shift = PredictStartpoint(masks)
        else
            masks[m].shift    = masks[m].eatrate - SD
        m++
    else
        m = PopOldMasks(m, masks, nozzles) //dispose of old unused masks StepMedia(SD);

Mask = CombineMasks(m, masks, nozzles)

SendData(Image, Mask)
```

FIG. 7

VARIABLE SMOOTHING IN PRINTING

CROSS-REFERENCE TO RELATED APPLICATION

This application is a continuation of U.S. patent application Ser. No. 16/510,572, filed on Jul. 12, 2019, which is incorporated herein by reference in its entirety.

TECHNICAL FIELD

The disclosed embodiments relate to printer systems and in particular to the use of multiple smoothing masks for printer systems and components.

BACKGROUND

Printers that use a columnar array of print elements or nozzles typically require the column of nozzles be swept horizontally across the printed medium while the nozzles selectively print points that represent printed pixels. Techniques such as interleaving and/or interlacing have been introduced to minimize or conceal printing artifacts caused by the printer components and/or the printed medium. However, such techniques often reduce the throughput of the printers, resulting in longer printing time. There exists a need to minimize printing time while maintaining the desired printing quality.

SUMMARY

The disclosed embodiments relate to methods, devices and systems that utilize multiple printing masks to achieve variable printing qualities.

One example aspect of the disclosed embodiments relates to a printer system that includes an array of nozzles and a control device coupled to the array of nozzles. The control device is configured to determine a step size for printing a current section of an image based on a set of masks. The set of masks includes one or more masks used for printing previous sections of the image. The control device is also configured to adjust the set of masks based on a printing mode to be used for the current section of the image. The array of nozzles is configured to print the current section of the image using a combination of the adjusted set of masks.

Another example aspect of the disclosed embodiments relates to a method for printing an image using an array of nozzles. The method includes determining, by a printer system, a step size for printing a current section of the image based on a set of masks. The set of masks includes one or more masks used for printing previous sections of the image. The method also includes adjusting the set of masks based on a printing mode to be used for the current section of the image and printing the current section of the image using a combination of the adjusted set of masks.

BRIEF DESCRIPTION OF THE DRAWINGS

FIG. 1C illustrates an example of an interlacing printing mode.

FIG. 1D illustrates an example mode that uses both interleaving and interlacing techniques.

FIG. 5A illustrates two example masks for printing an image in accordance with the disclosed technology.

FIG. 5B illustrates an example pass for applying a non-smoothing mask in accordance with the disclosed technology.

FIG. 6A illustrates another two example masks for printing an image in accordance with the disclosed technology.

FIG. 7 illustrates an example of pseudocode for determining the mask of a pass in accordance with the disclosed technology.

DETAILED DESCRIPTION

Printers that use a column of print elements or nozzles typically require the column of nozzles to be swept horizontally across the printed medium while the nozzles selectively print points that represent printed pixels. Inherent print defects can occur in such operations. For example, paper feed inaccuracies and nozzle-to-nozzle variations in drop size or placement can introduce artifacts such as a visible band. Interlacing is a technique to reduce such printing artifacts. Using interlacing, different rows and columns are addressed by the nozzles in different printing passes, thereby reducing the visual impact of artifacts.

Figure 1A:
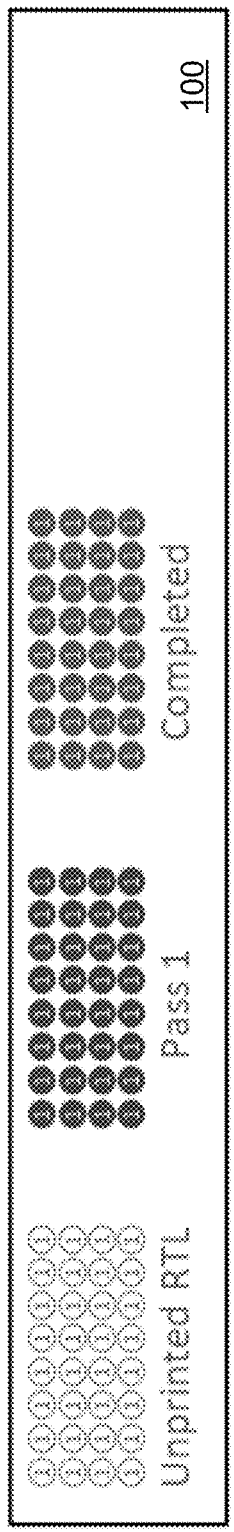
FIG. 1A illustrates an example printing mode without using interlacing.
Figure 1B:
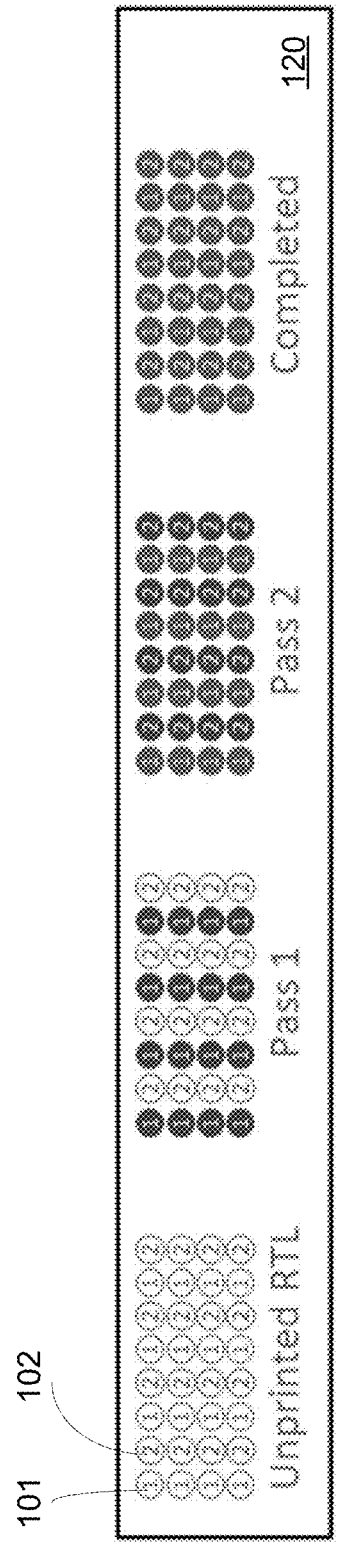
FIG. 1B illustrates an example enhanced printing mode.

FIGS. 1A-1D illustrate several example printing modes. FIG. 1A illustrates an example printing mode 100 without using interlacing. In this mode 100, every pixel is addressed on every pass. Printing all the desired pixels thus requires only one pass. FIG. 1B illustrates an example enhanced printing mode 120. In this mode 120, pixels are divided vertically into two groups, with one group marked as 1 (101) and the other group marked as 2 (102). In the first pass, only pixels in group 101 are addressed and pixels in group 102 are passed over. In the second pass, only pixels in group 102 are addressed and pixels in group 101 are passed over. Printing all the desired pixels thus requires two passes. This mode 120 is sometimes referred to as interleaving. FIG. 1C illustrates an example of an interlacing printing mode 140. In this mode, pixels are divided horizontally into two groups: group 1 (111) and group 2 (112). In the first pass, images rows that are not addressable (i.e., in group 2) are passed over. Only the rows in group 1 are printed. In the second pass, the passed over rows are addressed to complete the printing process. This is a common implementation when the nozzle array is at a lower pitch than the finished image. This mode 140 is also referred to as the "true interlacing" mode.

FIG. 1D illustrates an example mode 160 that uses both interleaving and interlacing techniques. In this mode 160, the pixels are divided horizontally and vertically into four groups. In the two passes, as in the enhanced mode shown in FIG. 1B, selected columns of pixels are passed over. The interlacing mode as shown in FIG. 1C is adopted to print pixel group 121 in the first pass and pixel group 122 in two passes. The passed over columns are then printed in the subsequent passes, with pixel group 123 printed in the third pass and pixel group 124 printed in the fourth pass.

Figure 2:
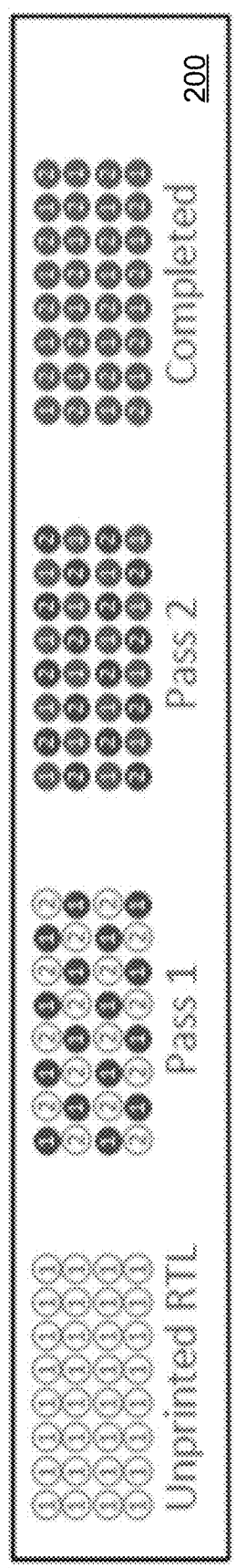
FIG. 2 illustrates an example printing mode that utilizes a smoothing mask to enhance the effect of interlacing.

On top of interlacing techniques, print masks can be applied to the nozzle array as a way to increase the interlacing effect to further reduce visual impact of the printer defects. In this document, the print masks are also referred to as smoothing masks. FIG. 2 illustrates an example printing mode 200 that utilizes a smoothing mask. In this mode, a checkerboard mask is applied to the addressable pixels in the first pass. In the second pass, the inverse of the original checkerboard is applied so that the remaining pixels can be addressed. It is noted that in order to complete the image, the first and the second masks must complement each other. Thus, they are also referred to as the supplement and complement masks.

Figure 3A:
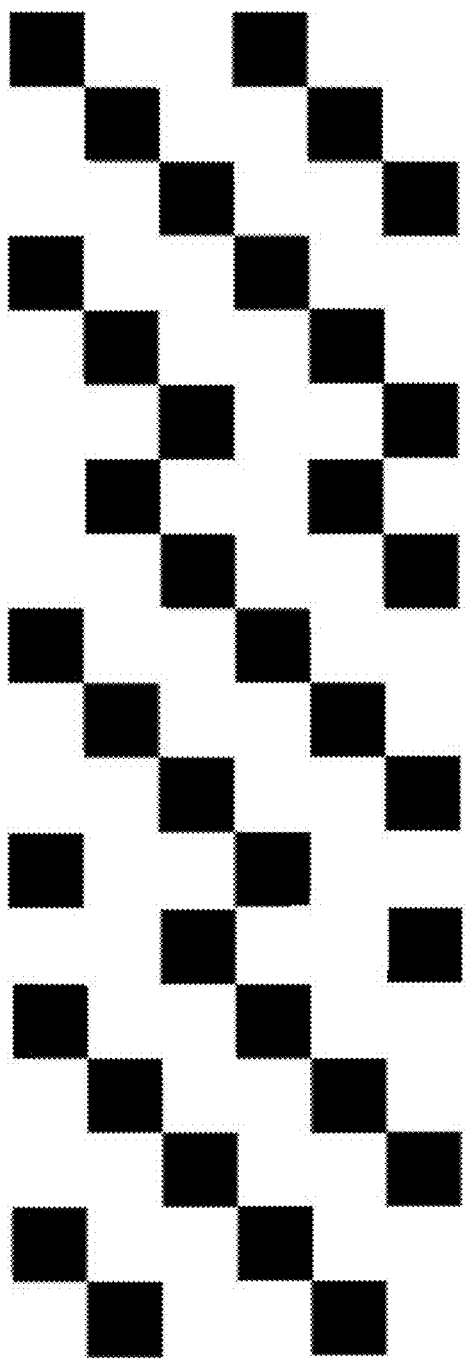
FIG. 3A illustrates an example smoothing mask that uses a ⅓ checkerboard pattern in accordance with the disclosed technology.
Figure 3B:
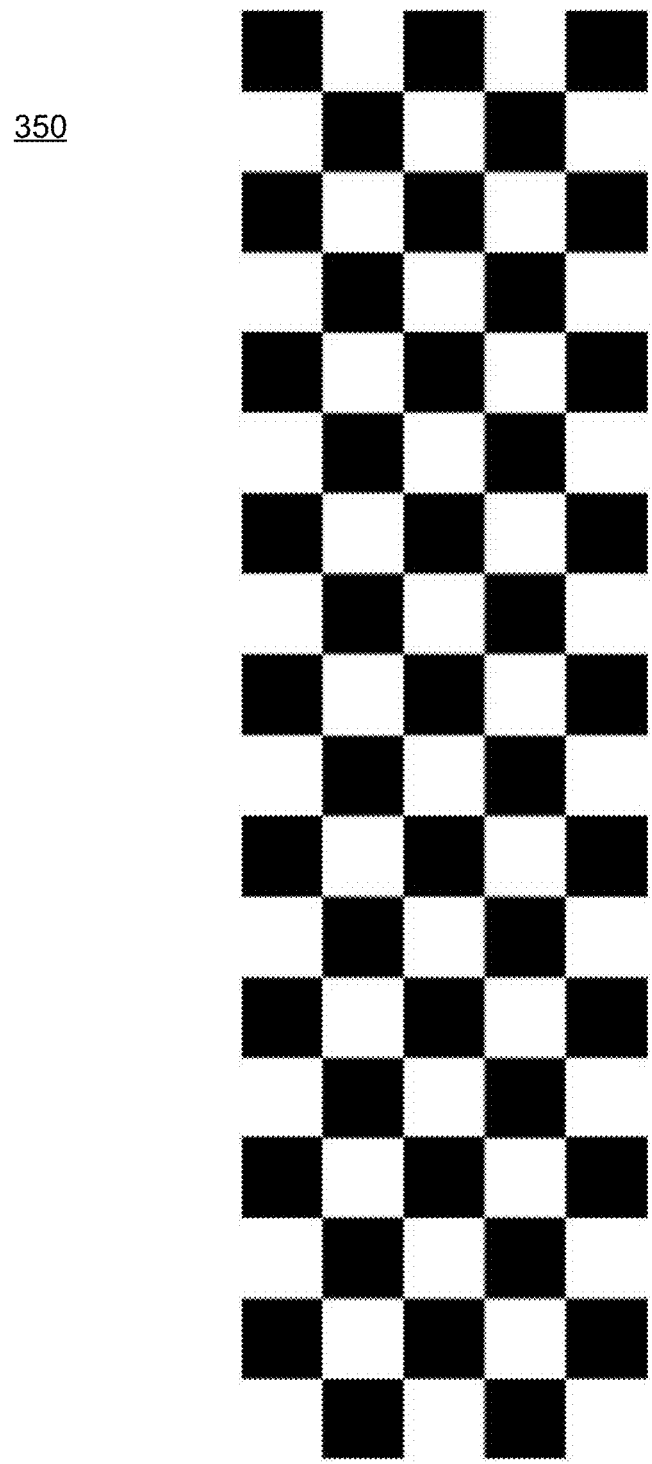
FIG. 3B illustrates another example smoothing mask that uses a ½ checkerboard pattern in accordance with the disclosed technology.

Other types of smoothing masks can be designed to create different levels of printing quality. For example, while the ½ checkerboard mask can be used to perform smoothing (which allows every pixel to be addressed in two passes), another mask can be designed to perform more smoothing. FIG. 3A illustrates an example smoothing mask 300 that uses a ⅓ checkerboard pattern in accordance with the disclosed technology. This mask allows each pixel to be addressed three times. FIG. 3B shows another example mask 350 that uses a ½ checkerboard pattern in accordance with the disclosed technology. Mask 350 addressed each pixel twice, thereby providing less smoothing as compared to the mask 300 shown in FIG. 3A but faster throughput.

Designing masks takes a great deal of effort—various factors such as the printer configuration and desired quality level must be taken into account to generate an effective mask. Currently, once a mask is selected for a given input image, the smoothing level cannot be changed on the fly. However, not all areas in an input image require the same printing quality. Some areas are less susceptible to printer defects and are thus "easier to print," while other areas need multiple passes to ensure the desired quality. Throughput of the printer also becomes an issue when heavy smoothing masks are used. For example, the heavy smoothing masks as shown in FIG. 2 can double randomization of printing errors, thereby concealing visible defects more effectively. However, the total throughput of the printer is reduced because each pixel is addressed multiple times to complete the printing process. The low throughput increases the printing time. In some cases, high quality printing modes that utilize heavy smoothing can take more than an hour to complete a billboard.

Figure 4:
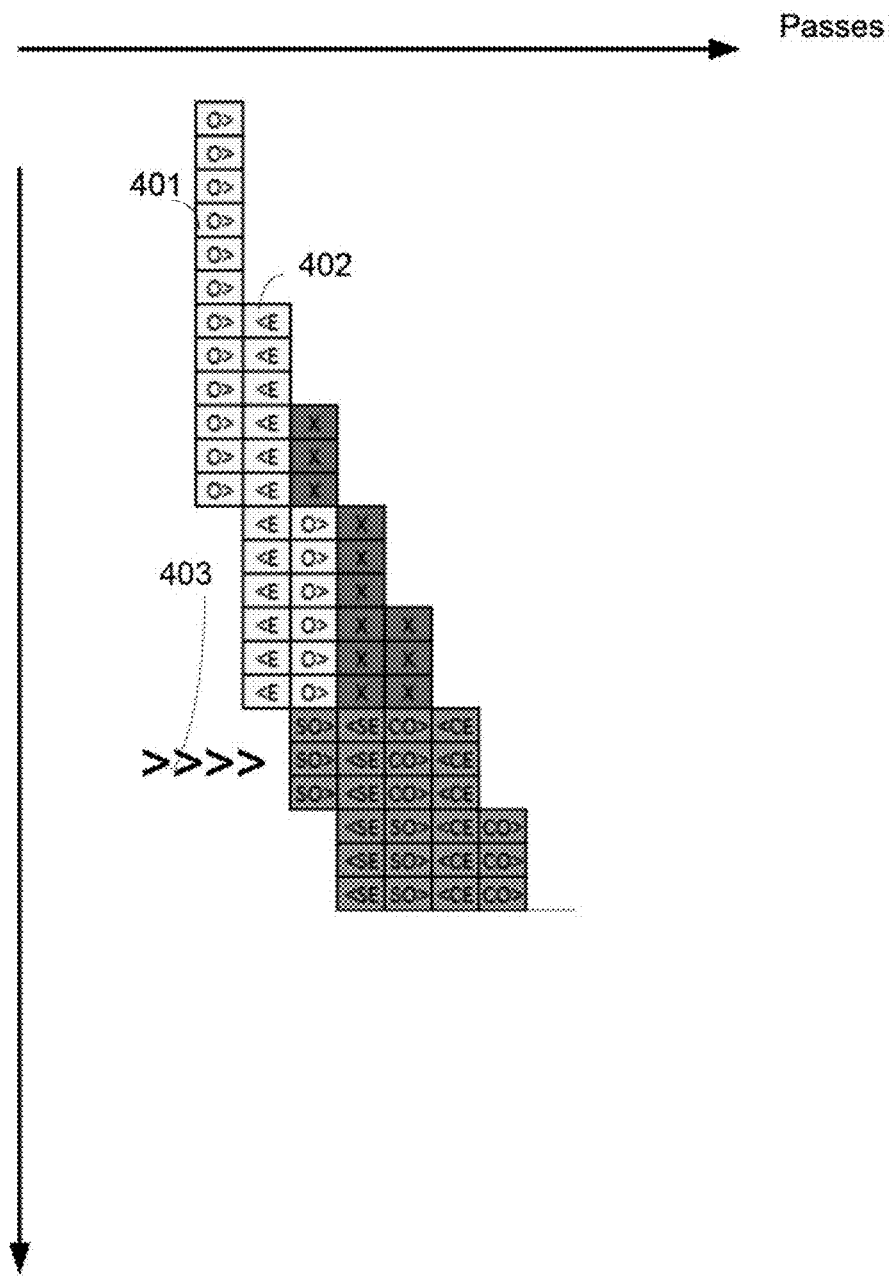
FIG. 4 illustrates a schematic diagram of using multiple smoothing masks for printing an image in accordance with the disclosed technology.

This patent document discloses techniques that can be implemented in various embodiments to manage multiple smoothing masks at the same time, thereby providing variable smoothing levels on the fly. The disclosed techniques can achieve different printing qualities in a single image and can maximize printing speed in easy-to-print areas while providing desired quality in other areas. FIG. 4 illustrates a schematic diagram of using multiple smoothing masks for printing an image in accordance with the disclosed technology. In FIG. 4, the horizontal axis indicates the passes that the printer takes to print a step (e.g., one or more rows of pixels). The vertical axis indicates the top-to-bottom direction that the printer head moves to print the image. In some embodiments, a technician responsible for printing the image determines which masks are needed based on the image content and the desired quality. The technician can also manually determine which section of the image requires which masks and provides commands to the printer indicating when transitions between the masks need to happen. In some embodiments, the printer system can automatically determine, in part based on analysis of the image, which smoothing mask is applicable to which section of the image. For example, the printer system can be trained using supervised training to learn the proper masks to choose.

The printing process in FIG. 4 starts with a printing mode that requires two passes to perform a printing step, as FIG. 1B. The addressed pixels and the printing direction are indicated in each pass (represented by a rectangle). For example, the first pass 401 is printed from left to right (indicated by arrow ">") and the addressed pixels include the odd columns (indicated by letter "O"). The next pass 402 is printed from right to left (indicated by arrow "<") and the addressed pixels include the even columns (indicated by letter "E"). As the printer progresses downwards, a command 403 can be used to indicate that a change is about to happen. The change can be a shift of the mask to compensate the movement of the printer head (e.g., the change between "<E O>" to "O><E" in the two passes that the printer performs), a switch of the mask (e.g., a switch between a two-pass mask to a three-pass mask), or a combination thereof. For example, a command 403 can be provided to the printer system to indicate a switch from the first mask to a second mask, which requires three-passes to complete a printing step. The command 403 can be given ahead of time (e.g., two to three passes before the change needs to complete) so that the printer system can adjust the masks accordingly or the process can begin on the pass when the signal is first read.

Figure 5C:
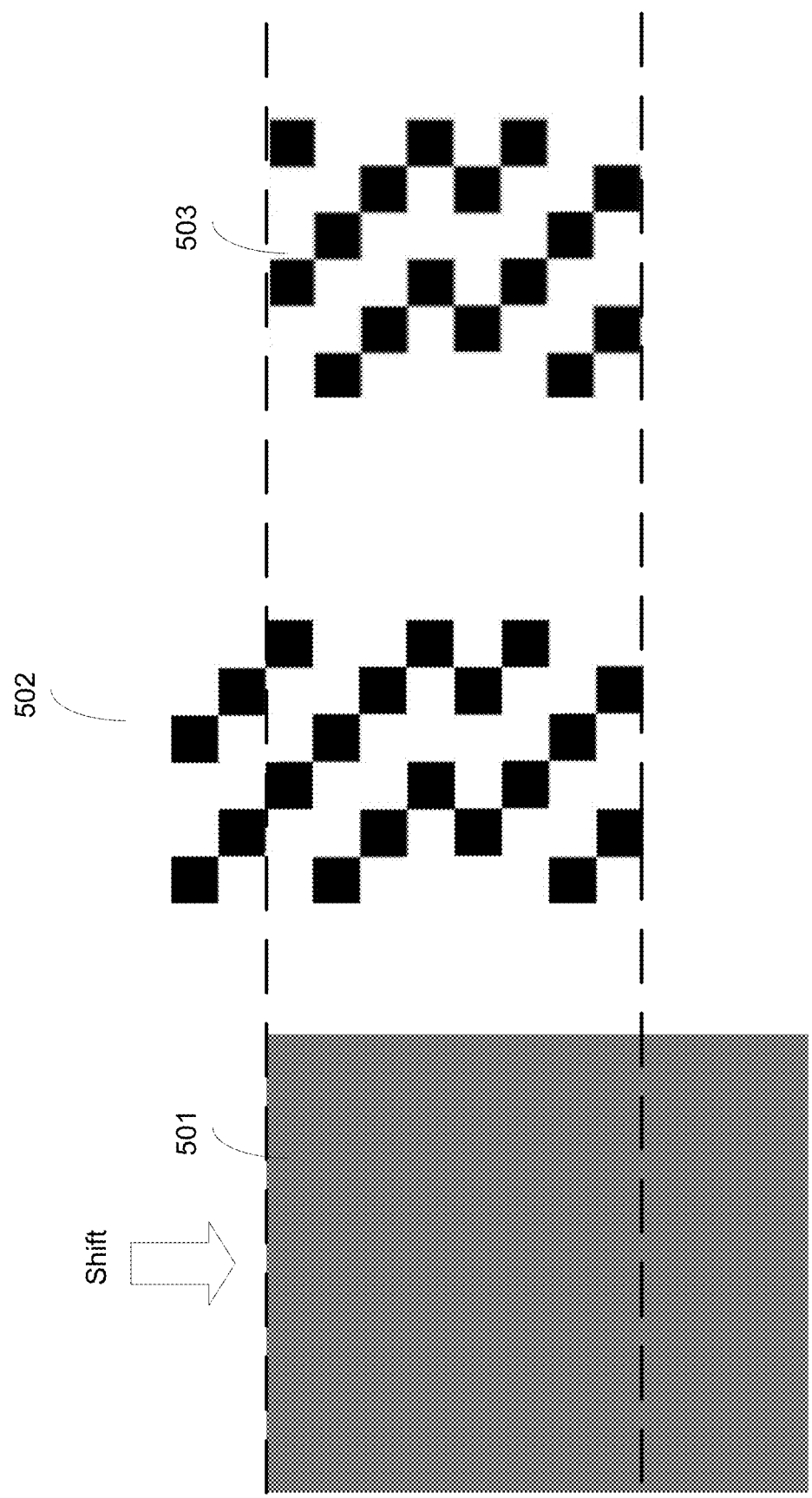
FIG. 5C illustrates an example pass in which a printer system transitions into a smoothing mask in accordance with the disclosed technology.

FIGS. 5A-5C illustrates an example of using multiple masks for printing an image in accordance with the disclosed technology. Each of the masks can be associated with the following attributes:

Identifier (ID): A filename or another identifier that identifies the mask.

Rate: The number of image rows (in pixel) that can be completed per pass using the mask.

Shift: The amount of shift of the mask with respect to the printing array.

Overlap: The number of nozzles to apply the mask per pass.

In this specific example, two masks are used: a non-smoothing mask 501 and a smoothing mask 502, as shown in FIG. 5A. Because the smoothing mask 502 requires more passes to complete than the non-smoothing mask 501, the corresponding printing rate is lower (that is, the printer system prints at a lower speed). As an example, the non-smoothing mask 501 has a rate of 1907 pixels (px) while the smoothing mask 502 has a rate of 960 px. It is noted that there is no interlacing in this example—one nozzle indicates one pixel in the printed image. With a density of 600 Dots Per Inch (DPI), for example, a rate of 1907 px is about 1907/600=3.1793 inches. The maximum number of nozzles to apply the mask is 1920 px.

The printing process begins with one active mask—the non-smoothing mask 501. FIG. 5B illustrates an example pass for applying the non-smoothing mask 501 in accordance with the disclosed technology. In every pass, the step size can be set to the smallest rate of the current masks. The initial step size used by the printer is 1907 px according to the rate of the only active mask—the non-smoothing mask 501.

After several passes, the printer system receives a command that indicates a change of printing mode. The printer system then prepares for the change by adding the smoothing mask 502, which corresponds to the new printing mode, into the current mask(s). FIG. 5C illustrates an example pass in which the printer system transitions into the new smoothing masks 502 in accordance with the disclosed technology. Because the printing rate is getting slower (due to the fact that a more complex mask is introduced), the step size needs to be adjusted accordingly. Here, the step size is adjusted to be the smallest rate of the current masks, which now becomes 960 px, the rate of the smoothing mask 502.

The shift of the previous mask is increased by (the mask's rate—step size). In this case, the initial shift for the previous non-smoothing mask is 0 px. The non-smoothing mask has a rate of 1907 px. The new shift for the non-smoothing mask is thus increased to 1907-960=947 px. Overlap of the new smoothing mask is increased by the step size and becomes 960 px. The overlap nozzles replace the previous non-smoothing mask, resulting in an intermediate mask 503.

Figure 5D:
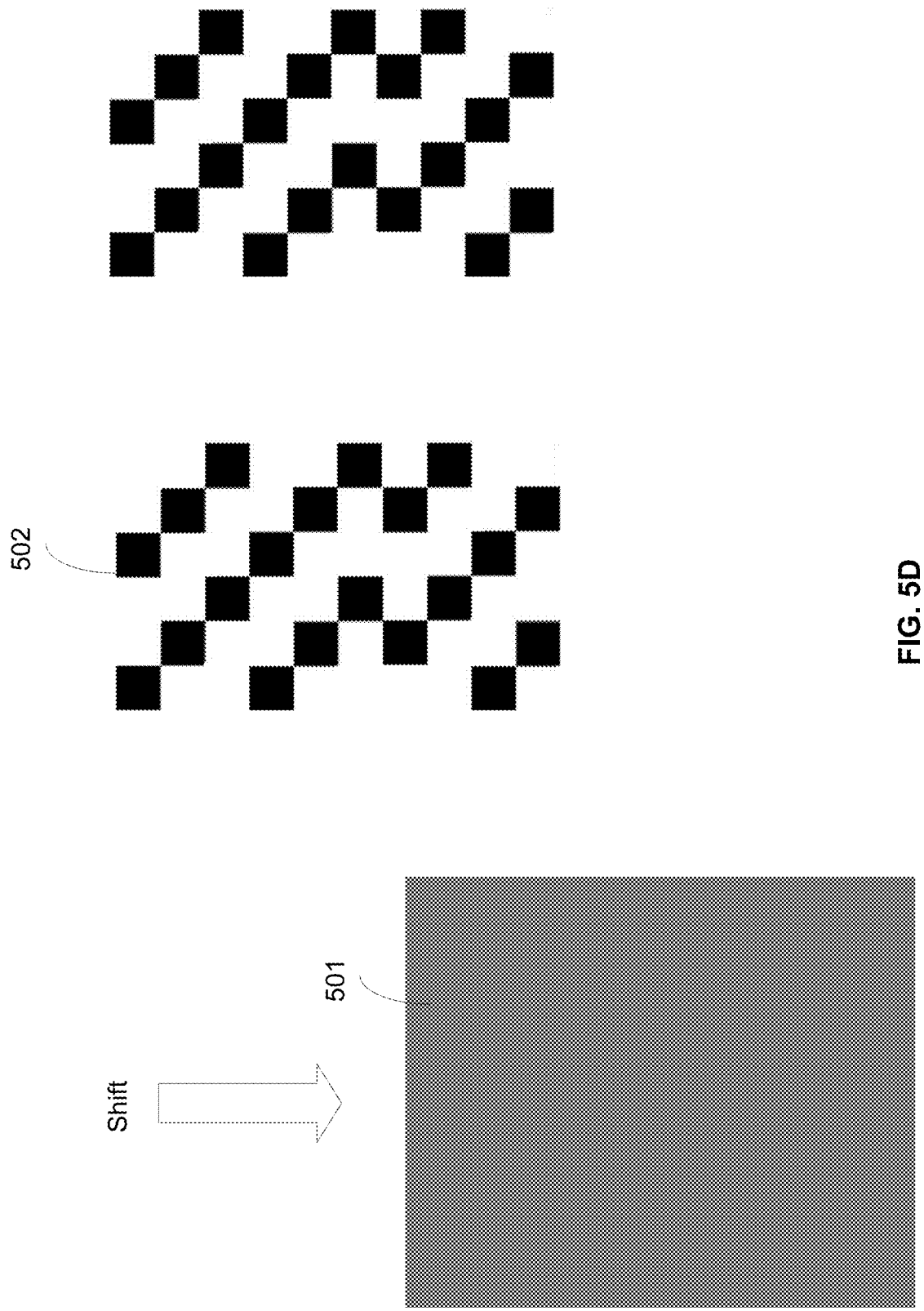
FIG. 5D illustrates a subsequent pass after the example pass shown in FIG. 5C in accordance with the disclosed technology.

FIG. 5D illustrates a subsequent pass after the example pass shown in FIG. 5C in accordance with the disclosed technology. The current masks are still the non-smoothing mask 501 and the smoothing mask 502. Therefore, the step size remains at 960 px. The shift of the non-smoothing mask is increased again by (mask's rate—step size) and becomes 947 px. The shift of the smoothing mask is increased by (960-960)=0 px. Overlap of the smoothing mask is increased by the step size and reaches the maximum value of 1920 px. The overlap nozzles replace the previous non-smoothing mask—the full smoothing mask 502 is now being used. The non-smoothing mask can thus be removed from current mask(s) after this pass. The switch to the smoothing mask is then complete.

Figure 6B:
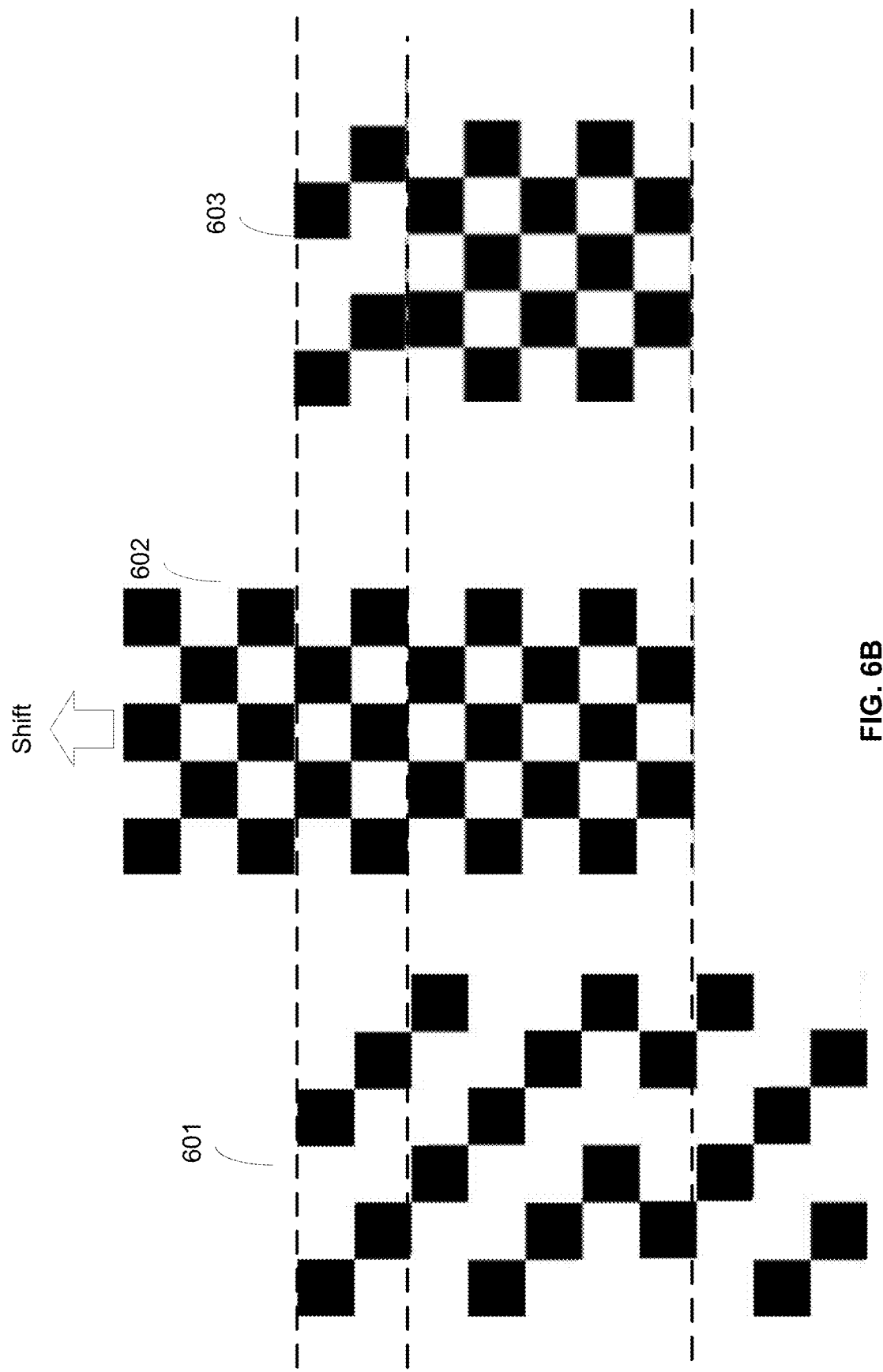
FIG. 6B illustrates an example pass in which a printer system transitions into a smoothing mask in accordance with the disclosed technology.

FIGS. 6A-6B illustrates another example of using multiple masks for printing an image in accordance with the disclosed technology. In this specific example, two masks are used: a 3× smoothing mask 601 and a 2× smoothing mask 602, as shown in FIG. 6A. Because the 2× smoothing mask 602 requires fewer passes to complete than the 3× smoothing mask 601, the corresponding printing rate is higher. As an example, the 3× smoothing mask 601 has a rate of 640 px and the 2× smoothing mask 602 has a rate of 960 px. It is noted that there is also no interlacing in this example—one nozzle indicates one pixel in the printed image. The maximum number of nozzles to apply the mask is 1920 px.

The printing process begins with one active mask—the 3× smoothing mask 601. The initial step size is 640 px. The printer system receives a command to indicate a change in the active mask(s). The printer system then prepares for the transition by adding the 2× smoothing mask 602 into the current masks. FIG. 6B illustrates an example pass in which the printer system transitions into the 2× smoothing mask 602 in accordance with the disclosed technology. The step size remains at 640 px.

The shift of the previous 3× smoothing mask 601 is increased by (the mask's rate-step size). In this case, however, the shift becomes a negative value of −320 due to the fact that a less complex mask has been introduced yet the step size still remains the same. The actual shift performed to the 3× smoothing mask 601 is 0 px—that is, no shift is performed to the previous mask. Instead, the new mask is shifted upwards by 320 px. Overlap is still calculated the same way—overlap of the new 2× smoothing mask is increased by the step size and becomes 640 px. An intermediate mask 603 is determined based on a combination of the 3× smoothing mask 601 and the 2× smoothing mask 602.

In some embodiments, the printer system may face multiple consecutive changes of the modes/masks. As demonstrated in the examples above, sometimes multiple passes are needed before the printer system can completely switch from one mode (using one mask) into another mode (using a different mask). To allow the printer system to adjust the masks properly under consecutive changes, the system can keep track of the past movements of the masks and predict a shift location based on the past information.

FIG. 7 illustrates an example of pseudocode for determining the mask of a pass in accordance with the disclosed technology. For each step of printing, the printer system keeps track of a set of active masks. Some of the masks have been used in the previous passes and remain active. For each pass, the step size is calculated based on the set of active masks. For example, the step size is the smallest printing rate associated with the set of masks. The shift and overlap of each mask are then updated based on the step size. If the printer system receives an indication that a new pass mode is used, a new mask is added to the set of active masks. Some of the mask attributes (e.g., the shift amount) are adjusted based on the step size. If the pass mode remains the same, the printer system checks if old unused masks can be discarded from the set. The adjusted active masks are then combined based on the respective attributes to produce an intermediate mask (e.g., the intermediate masks 503 and 603 as shown in FIGS. 5C and 6B) for printing the current pass.

Figure 8:
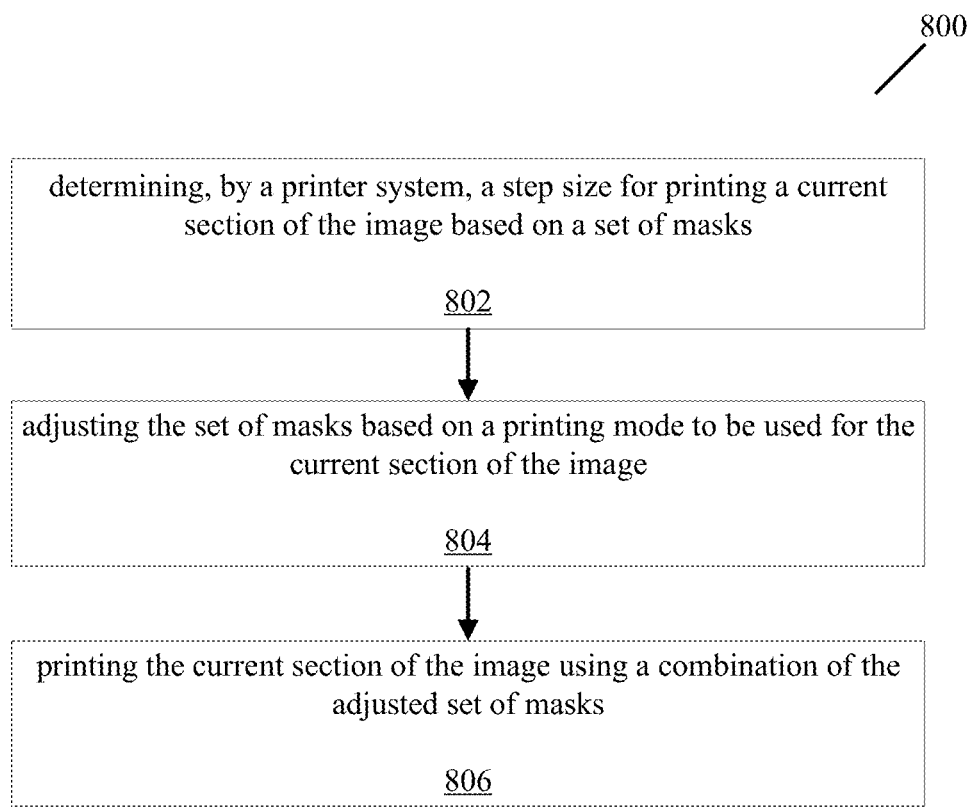
FIG. 8 illustrates a flowchart representation of a method for printing an image using an array of nozzles in accordance with the disclosed technology.

FIG. 8 is a flowchart representation of a method 800 for printing an image using an array of nozzles in accordance with the disclosed technology. The method 800 includes, at operation 802, determining, by a printer system, a step size for printing a current section of the image based on a set of masks. The set of masks includes one or more masks used for printing previous sections of the image. The method 800 includes, at operation 804, adjusting the set of masks based on a printing mode to be used for the current section of the image. The method 800 also includes, at operation 806, printing the current section of the image using a combination of the adjusted set of masks.

Figure 9:
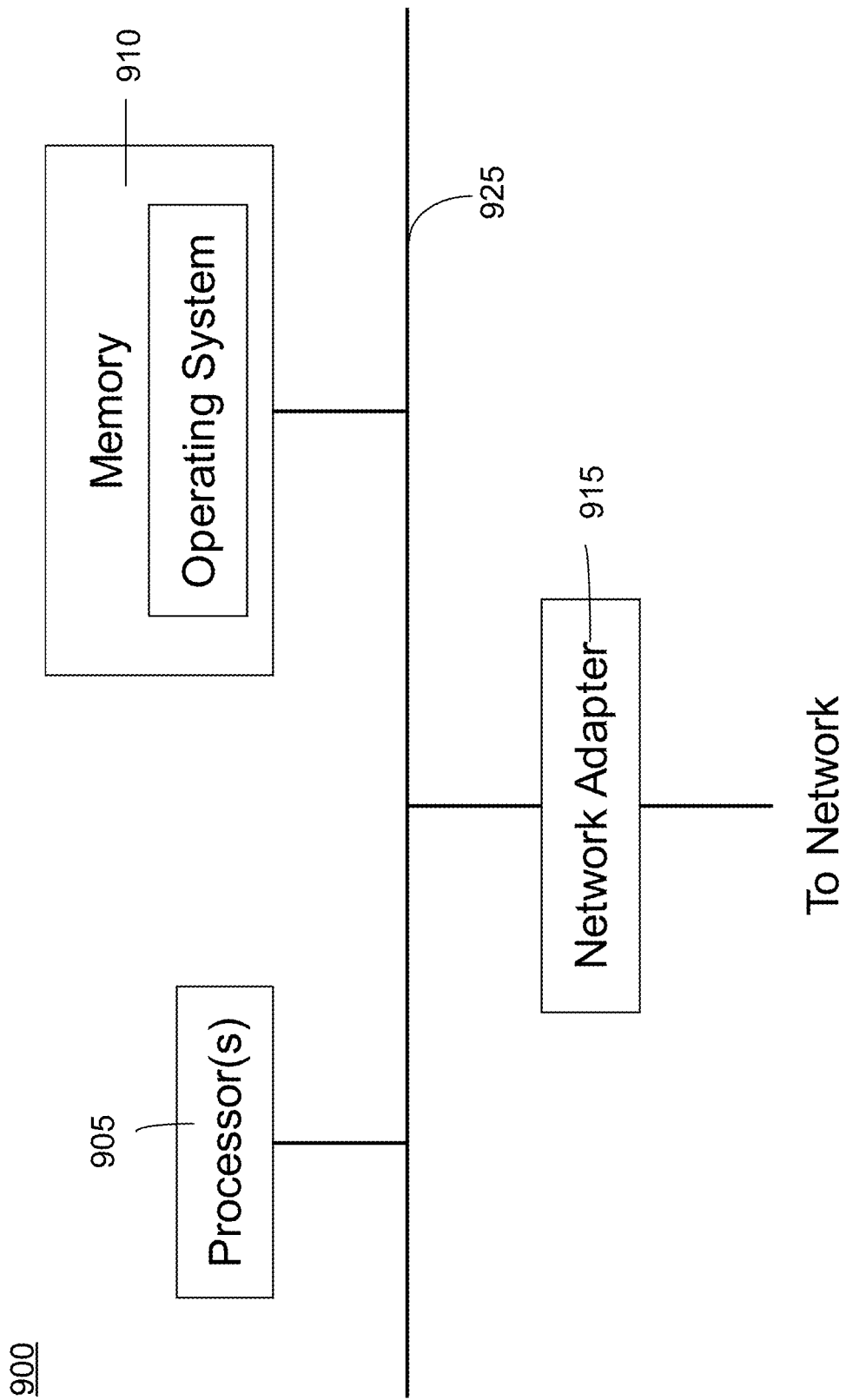
FIG. 9 illustrates a block diagram of an example computer system architecture or other control device that can be utilized to implement various portions of the presently disclosed technology.

FIG. 9 is a block diagram illustrating an example of the architecture for a computer system or a control device 900 of the printer system that can be utilized to implement various portions (e.g., controlling the array of nozzles) of the presently disclosed technology. In FIG. 9, the control device 900 includes one or more processors 905 and memory 910 connected via an interconnect 925. The interconnect 925 may represent any one or more separate physical buses, point to point connections, or both, connected by appropriate bridges, adapters, or controllers. The interconnect 925, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 905 may include central processing units (CPUs), graphics processing units (GPUs), or other types of processing units (such as tensor processing units) to control the overall operation of, for example, the host computer. In certain embodiments, the processor(s) 905 accomplish this by executing software or firmware stored in memory 910. The processor(s) 905 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 910 can be or include the main memory of the computer system. The memory 910 represents any suitable form of random access memory (RAM), read-only memory (ROM), flash memory, or the like, or a combination of such devices. In use, the memory 910 may contain, among other things, a set of machine instructions which, when executed by processor 905, causes the processor 905 to perform operations to implement embodiments of the presently disclosed technology.

Also connected to the processor(s) 905 through the interconnect 925 is a (optional) network adapter 915. The network adapter 915 provides the computer system 900 with the ability to communicate with remote devices, such as the storage clients, and/or other storage servers, and may be, for example, an Ethernet adapter or Fiber Channel adapter.

Using the disclosed techniques, an image can be printed using variable quality levels on the fly, thus eliminating the need to print the same image multiple times. Optimal printing speed can be achieved by the printer system while maintaining the desired quality level.

In one example aspect, a printer system includes an array of nozzles, and a control device coupled to the array of nozzles. The control device is configured to determine a step size for printing a current section of an image based on a set of masks. The set of masks includes one or more masks used for printing previous sections of the image. The control device is also configured to adjust the set of masks based on a printing mode to be used for the current section of the image. The array of nozzles is configured to print the current section of the image using a combination of the adjusted set of masks.

In some embodiments, each mask of the set of masks is associated with a printing rate, and wherein the step size is determined by a smallest printing rate of all masks in the set of masks.

In some embodiments, each mask of the set of masks is associated with a first attribute and a second attribute. The first attribute indicates an amount of shift of the mask with respect to the array of nozzles, and the second attribute indicates a number of nozzles to be used for applying the mask. In some embodiments, the control device is further configured to determine, for each mask in the set of masks, the first attribute based on the step size and a printing rate of the mask. The control device can be further configured to determine, for each mask in the set of masks, the second attribute based on the step size.

In some embodiments, the control device is configured to add a new mask to the set of masks upon determining that the printing mode is different from a previous printing mode. The control can be configured to set the first attribute of the new mask based on a printing rate of the new mask and the step size. The control device can also be configured to set the first attribute of the new mask by tracking past changes of first and second attributes of the set of masks.

In some embodiments, the control device is configured to determine the second attribute of the new mask based on the step size. In some embodiments, the control device is further configured to shift each of the set of masks according to the first attribute of the mask and determine, based on second attributes of all shifted masks in the set of masks, an overlapped area in the array of nozzles to be used for printing the current section of the image. The control device can be configured to adjust the set of masks by removing one or more unused masks from the set of masks upon determining that the printing mode is same as a previous printing mode.

In another example aspect, a method for printing an image using an array of nozzles includes determining, by a printer system, a step size for printing a current section of the image based on a set of masks. The set of masks includes one or more masks used for printing previous sections of the image. The method also includes adjusting the set of masks based on a printing mode to be used for the current section of the image and printing the current section of the image using a combination of the adjusted set of masks.

In some embodiments, each mask of the set of masks is associated with a printing rate, and the step size is determined by a smallest printing rate of all masks in the set of masks. In some embodiments, each mask of the set of masks is associated with a first attribute and a second attribute. The first attribute indicates an amount of shift of the mask with respect to the array of nozzles, and the second attribute indicates a number of nozzles to be used for applying the mask.

In some embodiments, the method includes determining, for each mask in the set of masks, the first attribute based on the step size and a printing rate of the mask. In some embodiments, determining, for each mask in the set of masks, the second attribute based on the step size. In some embodiments, the adjusting of the set of masks includes adding a new mask to the set of masks upon determining that the printing mode is different from a previous printing mode.

In some embodiments, the method includes determining the first attribute of the new mask based on a printing rate of the new mask and the step size. In some embodiments, the method includes determining the first attribute of the new mask by tracking past changes of first and second attributes of the set of masks. In some embodiments, the method includes determining the second attribute of the new mask based on the step size In some embodiments, the combination of the adjusted set of masks is determined by shifting each mask of the set of masks based on the first attribute of the mask, and determining, based on second attributes of all shifted masks in the set of masks, an overlapped area in the array of nozzles to be used for printing the current section of the image. In some embodiments, the adjusting of the set of masks includes removing one or more unused masks from the set of masks upon determining that the printing mode is same as a previous printing mode.

The control device(s) that are described in connection with the disclosed embodiments can be implemented as hardware, software, or combinations thereof. For example, a hardware implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application.

Various embodiments described herein are described in the general context of methods or processes, which may at least in part be implemented by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A printer system, comprising an array of nozzles and a control device, wherein the control device is configured to control the array of nozzles to:
   print, in a first printing mode, a first section of an image using a first mask, wherein the first mask is associated with a first printing rate;
   determine a second mask based on a switch from the first printing mode to a second printing mode, wherein the second mask is associated with a second printing rate;
   determine a step size for printing a second section of the image based on the first printing rate associated with the first mask and the second printing rate associated with the second mask; and
   print the second section of the image using the determined step size.

2. The printer system of claim 1, wherein the step size is determined based on a smaller printing rate of the first printing rate and the second printing rate.

3. The printer system of claim 1, wherein a set of active masks used for printing the image comprises the first mask and the second mask, and wherein each mask in the set of active masks is associated with a first attribute and a second attribute, wherein the first attribute indicates an amount of shift of the mask with respect to the array of nozzles, and wherein the second attribute indicates a number of nozzles to be used for applying the mask.

4. The printer system of claim 3, wherein the control device is further configured to:
   determine, for a mask in the set of active masks, the first attribute based on the step size and a printing rate associated with the mask.

5. The printer system of claim 3, wherein the control device is further configured to:
   determine, for a mask in the set of active masks, the second attribute based on the step size.

6. The printer system of claim 3, wherein the control device is further configured to:
   add a third mask to the set of active masks upon a switch from the second printing mode to a third printing mode.

7. The printer system of claim 6, wherein the control device is further configured to:
   determine the first attribute of the third mask based on tracking past changes of first and second attributes of the set of active masks.

8. The printer system of claim 6, wherein the control device is further configured to:
   determine the second attribute of the third mask based on the step size.

9. The printer system of claim 3, wherein the control device is further configured to:
   shift a mask in the set of active masks according to the first attribute of the mask; and
   determine, based on second attributes of all shifted masks in the set of active masks, an overlapped area in the array of nozzles to be used for printing a section of the image.

10. The printer system of claim 3, wherein the control device is configured to remove one or more unused masks from the set of active masks upon determining that the second printing mode is same as a previous printing mode.

11. A method for printing an image using an array of nozzles, comprising:
    printing, by a printer system, a first section of the image using a first mask, wherein the first section of the image is printed in a first printing mode, and wherein the first mask is associated with a first printing rate;
    determining, by the printer system, a second mask based on a switch from the first printing mode to a second printing mode, wherein the second mask is associated with a second printing rate;
    determining, by the printer system, a step size for printing a second section of the image based on the first printing rate associated with the first mask and the second printing rate associated with the second mask;
    printing the second section of the image using the determined step size.

12. The method of claim 11, wherein the step size is determined based on a smaller printing rate of the first printing rate and the second printing rate.

13. The method of claim 12, wherein a set of active masks used for printing the image comprises the first mask and the second mask, and wherein each mask in the set of active masks is associated with a first attribute and a second attribute, wherein the first attribute indicates an amount of shift of the mask with respect to the array of nozzles, and wherein the second attribute indicates a number of nozzles to be used for applying the mask.

14. The method of claim 13, comprising:
    determining, for a mask in the set of active masks, the first attribute based on the step size and a printing rate associated with the mask.

15. The method of claim 13, comprising:
    determining, for a mask in the set of active masks, the second attribute based on the step size.

16. The method of claim 14, comprising:
adding a third mask to the set of active masks upon a switch from the second printing mode to a third printing mode.

17. The method of claim 16, comprising:
determining the first attribute of the third mask based on tracking past changes of first and second attributes of the set of active masks.

18. The method of claim 16, comprising:
determining the second attribute of the third mask based on the step size.

19. The method of claim 13, further comprising:
shifting a mask in the set of active masks based on the first attribute of the mask;
determining, based on second attributes of all shifted masks in the set of active masks, an overlapped area in the array of nozzles to be used for printing a section of the image.

20. The method of claim 13, further comprising:
removing one or more unused masks from the set of active masks upon determining that the second printing mode is same as a previous printing mode.

\* \* \* \* \*